United States Patent
Küenzi et al.

(10) Patent No.: US 6,209,310 B1
(45) Date of Patent: Apr. 3, 2001

(54) METHOD AND APPARATUS FOR MONITORING THE FUEL AND WATER SUPPLY OF A GAS TURBINE MULTIBURNER SYSTEM

(75) Inventors: Thomas Küenzi, Birsfelden (CH); Gerhard Müller, Germering (DE)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/186,888

(22) Filed: Nov. 6, 1998

(30) Foreign Application Priority Data

Nov. 10, 1997 (EP) .................................. 97810845

(51) Int. Cl.$^7$ .................................. F02C 3/30; F02C 9/48
(52) U.S. Cl. .................... 60/39.05; 60/39.281; 60/39.3
(58) Field of Search ............................ 60/39.05, 39.06, 60/39.24, 39.281, 39.3

(56) References Cited

U.S. PATENT DOCUMENTS

| | | |
|---|---|---|
| 3,738,104 | 6/1973 | Rosa . |
| 4,922,233 | 5/1990 | Twerdochlib . |
| 4,922,710 | * 5/1990 | Rowen et al. ............. 60/39.281 |
| 4,992,946 | 2/1991 | Butz et al. . |
| 5,806,299 | * 9/1998 | Bauermeister et al. ........ 60/39.06 |

FOREIGN PATENT DOCUMENTS

| | | |
|---|---|---|
| 19518634A1 | 10/1995 | (DE) . |
| 0522832A1 | 1/1993 | (EP) . |
| 0529900A1 | 3/1993 | (EP) . |
| 0605158A1 | 7/1994 | (EP) . |
| 2197909 | 6/1988 | (GB) . |

OTHER PUBLICATIONS

Sobey et al. *Control Of Aircraft And missile Powerplants* Wiley and Sons, New York, 1963. pp. 317&320.*

* cited by examiner

Primary Examiner—Louis J. Casaregola
(74) Attorney, Agent, or Firm—Burns, Doane, Swecker & Mathis, L.L.P.

(57) ABSTRACT

In a method for monitoring the supply system (10) of a gas turbine having a multiburner system, said supply system (10) comprising at least one distribution system (15, 24), via which a pressurized medium required for operating the multiburner system is distributed to a plurality of individual burners (12, . . . , 14) opening into a combustion chamber, reliable detection and analysis of faults is achieved in that, while the gas turbine is operating, the pressure loss in the at least one distribution system (15, 24) is measured continuously, in that the measured pressure loss is compared with a desired value characteristic of the respective operating state of the gas turbine, and in that a communication is issued when the measured pressure loss deviates from the associated desired value by a predetermined value.

10 Claims, 2 Drawing Sheets

METHOD AND APPARATUS FOR MONITORING THE FUEL AND WATER SUPPLY OF A GAS TURBINE MULTIBURNER SYSTEM

BACKGROUND OF THE INVENTION

1. Field of the Invention

The present invention relates to the field of gas turbines. It refers to a method for monitoring the supply system of a gas turbine having a multiburner system, said supply system comprising at least one distribution system, via which a pressurized medium required for operating the multiburner system is distributed to a plurality of individual burners opening into a combustion chamber.

The invention refers, furthermore, to an apparatus for carrying out the method, comprising a plurality of burners which open into a combustion chamber and which are supplied via a fuel distribution system with a pressurized liquid fuel.

2. Discussion of Background

In modern gas turbines which are equipped with low-emission multiburner systems, the fuel is conveyed to the burners or fuel lances via a complex fuel distribution system. The same applies to water which is distributed to the burners via a corresponding water distribution system for the purpose of reducing the NOx emission. A series of switching valves, nonreturn valves and filters, which allow the fuel (water) to be distributed properly to the burners, is installed in the fuel and water lines.

While the plant is being assembled or operated, malfunctions of the fuel or water system may occur. For example, individual nonreturn valves may fail or switching valves may be wrongly activated. Moreover, in many cases, it has been shown, in practice, that impurities in the fuel system lead to the clogging of individual filters or fuel nozzles. In other cases, the regulating valves and fuel nozzles are subject to erosion phenomena due to small solid particles entrained in the fuel.

All the abovementioned irregularities in fuel distribution (or water distribution) lead to an uneven load on the burners and, consequently, to increased thermal load on individual hot gas parts. They thus shorten the lifetime of the gas turbine. It is therefore desirable to have the possibility of detecting malfunctions in the supply systems, in particular in fuel or water distribution, reliably at an early stage and thereby enable the operator of the gas turbine to conduct a clear analysis of the state of his plant.

SUMMARY OF THE INVENTION

Accordingly, one object of the invention is to provide a novel method, by means of which the supply system of a gas turbine can be monitored in a simple and reliable way and, if deviations occur, relevant countermeasures can be taken early, and to specify an apparatus for carrying out the method.

In a method of the type mentioned initially, the object is achieved in that, while the gas turbine is operating, the pressure loss in the at least one distribution system is measured continuously, in that the measured pressure loss is compared with a desired value characteristic of the respective operating state of the gas turbine, and in that a communication is issued when the measured pressure loss deviates from the associated desired value by a predetermined value. The supply systems of the gas turbine, in particular the fuel systems and fuel nozzles, may be operated in the form of a line-up of appliances having a fixed throughflow. The result of this is that, for any desired load state, there is, for example, a clearly defined fuel pressure loss or necessary fuel pressure. If, then, irregularities occur in the fuel distribution system, the fuel pressures actually measured deviate from the theoretic curve. The method according to the invention makes use of this fact.

A first preferred embodiment of the method according to the invention is distinguished in that, in order to measure the pressure loss in the at least one distribution system, the pressure at the inlet of the distribution system and in the combustion chamber is measured and the pressure difference is formed from the two pressure values, in that the medium to be distributed is fed to the at least one distribution system via a pump and a regulating valve located downstream of the pump, and in that, in order to determine the pressure in the distribution system, the pressure at the outlet of the regulating valve is measured. By selecting the measurement locations, the pressure drop (pressure loss) over the entire distribution system is measured in a simple way, without the constantly changing position of the regulating valve being able to have a noticeable falsifying effect.

In order to obtain in a simple manner a reference curve of desired values which has evidential force, said reference curve making it possible to detect all the changes in the plant during subsequent operation, is desirable if, according to a second preferred embodiment of the method according to the invention, in order to provide the desired values of the pressure loss of the at least one distribution system, the pressure loss in this distribution system is measured and stored for various possible operating states when the gas turbine is first commissioned.

The apparatus according to the invention for carrying out the method comprises a plurality of burners which open into a combustion chamber and which are supplied via a fuel distribution system with a pressurized liquid fuel. Said apparatus is defined in that a pressure transducer is arranged in each case both on the fuel distribution system and on the combustion chamber, and in that the pressure transducers are connected to a common monitoring unit.

A preferred embodiment of the apparatus according to the invention is defined in that the burners are combined in burner groups, in that each burner group is assigned its own fuel distribution system or water distribution system, and in that a pressure transducer is arranged for monitoring in each fuel distribution system or water distribution system and is connected to the monitoring unit.

Further embodiments emerge from the dependent claims.

BRIEF DESCRIPTION OF THE DRAWINGS

A more complete appreciation of the invention and many of the attendant advantages thereof will be readily obtained as the same becomes better understood by reference to the following detailed description, when considered in connection with the accompanying drawings, wherein.

DESCRIPTION OF THE PREFERRED EMBODIMENT

Figure 1:
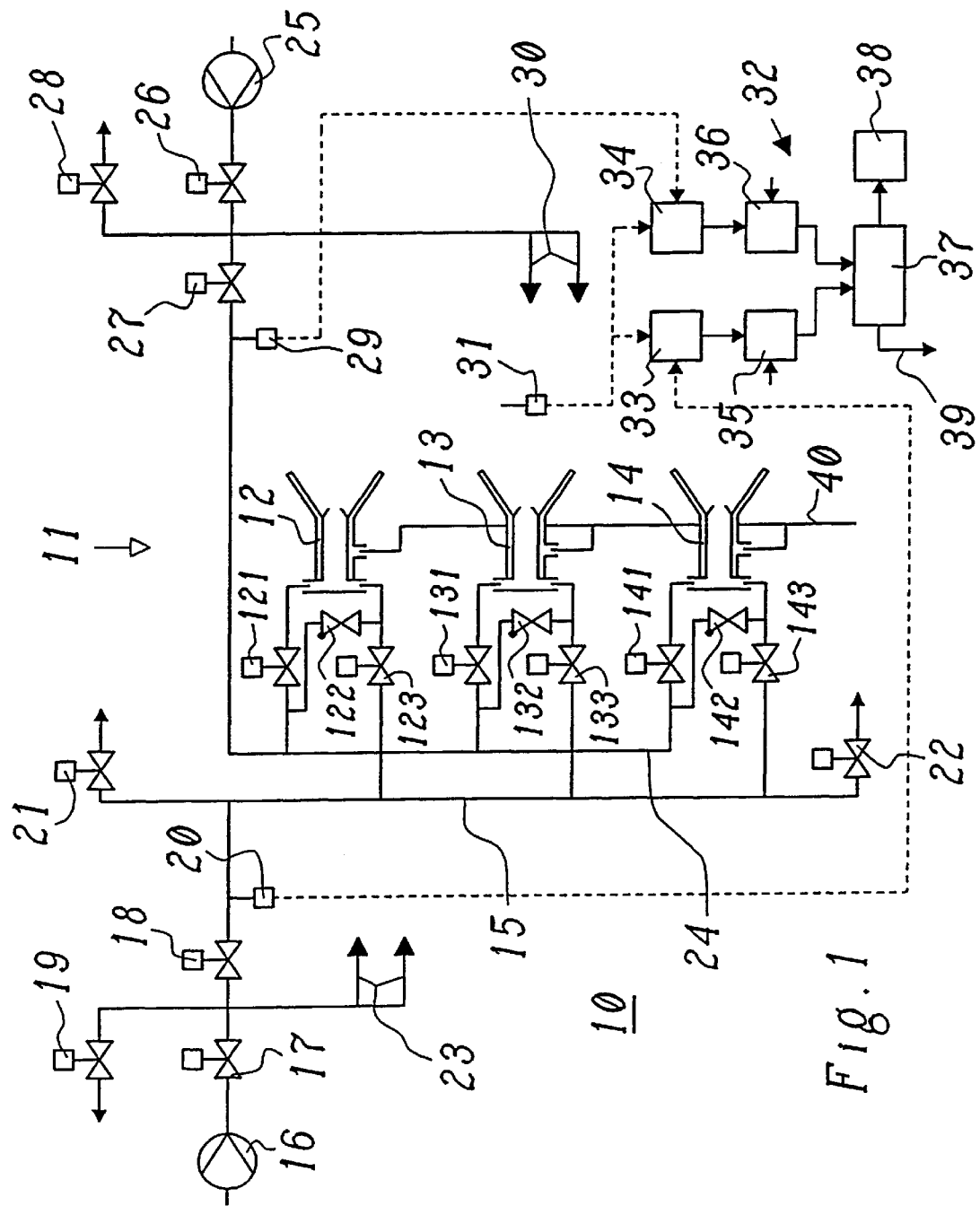
FIG. 1 shows a simplified plant diagram of a preferred exemplary embodiment of a gas turbine supply system with monitoring according to the invention.

Referring now to the drawings, wherein like reference numerals designate identical or corresponding parts throughout the several views, in FIG. 1 a preferred exemplary embodiment of a gas turbine supply system with monitoring according to the invention is reproduced in a simplified plant diagram. The supply system 10 supplies a plurality of burners or fuel lances 12, 13 and 14 which are combined to form a burner group 11. Further burners or burner groups are normally present, but are omitted in FIG. 1 for the sake of clarity. The supply system 10 comprises a fuel distribution system 15 and a water distribution system 24. The two distribution systems 15 and 24 are provided for the burner group 11. The other burner groups (not shown) are supplied by identical distribution systems (not shown).

Fuel (conventionally oil) is fed under pressure to the fuel distribution system 15 via a fuel pump 16, a downstream quick-acting stop valve 17 and a regulating valve 18. The fuel is distributed to the individual burners 12, ..., 14 by the fuel distribution system 15, a first section valve 123, 133, 143 being arranged on each burner 12, ..., 14, said section valve making it possible to control the fuel feed for each burner individually. In addition, a ventilating valve 21 and a bleed valve 22 are provided on the fuel distribution system 15 for maintenance purposes. Between the quick-acting stop valve 17 and the regulating valve 18 competent for the fuel distribution system 15, further lines 23 lead off to parallel fuel distribution systems and burner groups. All the fuel distribution systems are connected to a relief valve 19. In addition, the burners 12, ..., 14 may be supplied with fuel gas via a fuel gas feedline 40.

Water (or steam) is fed under pressure to the water distribution system 24 in a similar way to the fuel distribution system 15 via a water pump 25, a downstream quick-acting stop valve 26 and a regulating valve 27. The water is distributed to the individual burners 12, ..., 14 by the water distribution system 24, a second section valve 121, 131, 141 being arranged on each burner 12, ..., 14, said section valve making it possible to control the feed of water to each burner individually. A nonreturn valve 122, 132, 142 is provided transversely in each case between the pairs of section valves 121, 123 and 131, 133 and 141, 143. Between the quick-acting stop valve 26 and the regulating valve 27 competent for the water distribution system 24, further lines 30 lead off to parallel water distribution systems and burner groups. All the water distribution systems together are likewise protected by means of a common relief valve 28.

Figure 2:
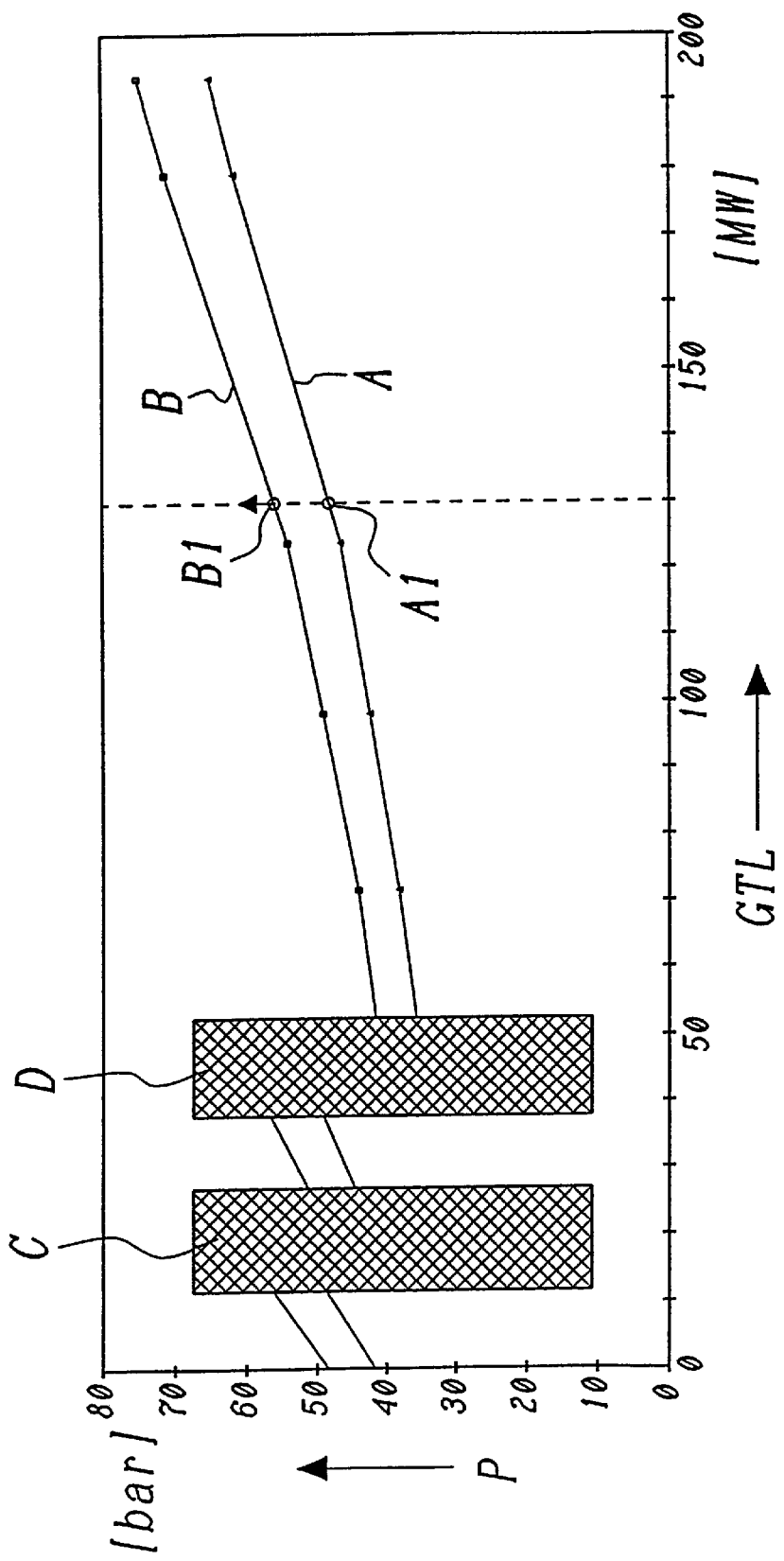
FIG. 2 shows a graph, as an example of the method according to the invention, of a desired value curve (A) and a limit value curve (B) for the pressure loss (P) in the fuel distribution system of a gas turbine as a function of the gas turbine output (GTL)

Both the fuel in the fuel distribution system 15 and the water in the water distribution system 24 experience a pressure loss due to the flow resistance in the system, said pressure loss being characteristic of the respective state of the system. In this case, the pressure loss is the pressure difference between the pressure at the inlet of the respective distribution system and at the outlet of the burners 12, ..., 14 or in the combustion chamber (not shown), into which the burners open and which receives compressed combustion air from the compressor part of the gas turbine. According to the invention, then, the pressure loss is measured and monitored. In this case, deviations from a reference value (desired value) or a reference value curve (desired value curve A or desired value A1 in FIG. 2) are detected and are utilized for the early analysis of faults in the supply system or for the early preparation of inspection and servicing work.

In order to measure the pressure loss, a pressure transducer 20 and 29 is arranged in each case at the inlet of each distribution system 15 and 24, behind the respective regulating valve 18 and 27, respectively, said pressure transducer measuring the inlet pressure in the distribution system continuously (for example, periodically) and transmitting the measured values (via the lines represented by broken lines) to a central monitoring unit (32). A further pressure transducer 31, which is arranged on the combustion chamber, at the same time measures the pressure in the combustion chamber and likewise transmits the measured values to the monitoring unit 32. In the monitoring unit 32, then, the differences from the pressure values measured by the pressure transducers 20 and 31 or 29 and 31 are formed in each case in differentiators 33 and 34 and are in each case transmitted to following comparators 35 and 36. There, the pressure differences, which correspond to the pressure losses in the distribution systems 15 and 24, are compared with desired values which are filed in a memory (not shown) and which are retrieved from there. The results of the comparison are transmitted to an evaluation unit 37. If a deviation of the measured pressure differences from the corresponding desired values which is greater than the predetermined limit value (limit value curve B or limit value B1 in FIG. 2) is detected in the comparators 35, 36, this is indicated by the evaluation unit 37 on an indicator 38. At the same time, the evaluation unit 37 transmits a corresponding control signal (warning or alarm signal) via a signal line 39 to a central control (not illustrated) of the gas turbine plant. Differentiation and result comparison may, of course, also be carried out in an appropriately programmed microcomputer. The pressure transducers 20, 29 and 31, in addition to performing the monitoring function, are also, of course, available for normal regulating tasks. For this purpose, their measured values are transmitted directly to the central control, although this is not dealt with in any more detail.

In order to provide the desired values or desired value curve, the following procedure is adopted: during commissioning, the combustion chamber operation concept is installed in such a way that the plant guarantees are met. In this case, the actual pressure drops or pressure losses in the fuel distribution systems or water distribution systems are measured and documented as a function of the output of the gas turbine and of the operating concept. This results, for the fuel pressure loss P (in bar), in, for example, the desired value curve A, shown in FIG. 2, as a function of the gas turbine output GTL (in MW). The desired value curve A shows, in the initial region (below 50 MW), discontinuities which are caused by changeovers and which are identified by blocked areas C, D. The monitoring method according to the application is interrupted in the blocked areas. In the other areas, the desired value curve A, which defines the desired state of fuel distribution, serves as a reference curve for the subsequent permanent measurements. Comparable desired value curves may also be derived and used in a similar way for the water distribution systems.

During commercial operation, the fuel pressure drops are measured via the selected system and are compared with the values expected in the relevant output range. If the gas turbine works, for example, just in the output range around 130 MW (broken line in FIG. 2), the measured value for the pressure drop is compared with the desired value A1 there on the desired value curve A. The desired value curve A, then, has an associated limit value curve B (FIG. 2) fixed for it, said limit value curve indicating how great the deviation of the actual value from the desired value may be, without an alarm being triggered or a corresponding communication being issued. For the output range around 130 MW, the associated limit value is designated, in FIG. 2, by B1. If, then, the pressure loss measured in the fuel distribution system exceeds the limit value B1 in the direction of the arrow, the presence of a fault is inferred from this in the monitoring unit 32. The way in which the deviation has come about, in particular the time profile of the deviation, allows a detailed analysis of the causes. If, for example, an abrupt change in the throughflow characteristic occurs, a malfunction of one of the valves of the group affected is probable. By contrast, if the characteristics vary continuously, this suggests a drifting of the valve drives or a clogging of filters and nozzles or the erosion of these as explanation of the cause.

The state of the fuel system of the gas turbine or of the supply system as a whole can thus be monitored permanently by using, according to the invention, the protective concept based on the monitoring of the throughflow characteristics of the distribution systems. Inspection and servicing work can be planned early and total failures of individual burner systems are reliably avoided.

The following particular advantages of the invention may be mentioned:

reduction in the load on hot gas parts increase in the lifetime of the components increase in plant availability optimization of inspection and servicing intervals.

Obviously, numerous modifications and variations of the present invention are possible in the light of the above teachings. It is therefore to be understood that, within the scope of the appended claims, the invention may be practiced otherwise than is specifically described herein.

What is claimed as new and desired to be secured by Letters Patent of the United States is:

1. A method for monitoring a supply system of a gas turbine having a multiburner system, the supply system comprising at least one distribution system, by which a pressurized medium required for operating the multiburner system is distributed to a plurality of individual burners opening into a combustion chamber, while the gas turbine is operating a pressure loss in the at least one distribution system is measured continuously wherein the measured pressure loss is compared with a desired value characteristic of the respective operating state of the gas turbine, and wherein a communication is issued when the measured pressure loss deviates from the associated desired value by a predetermined value, and in order to measure the pressure loss in the at least one distribution system, the pressure at the inlet of the distribution system and in the combustion chamber is measured and the pressure difference is formed from the two pressure values.

2. A method for monitoring a supply system of a gas turbine having a multiburner system, the supply system comprising at least one distribution system, by which a pressurized medium required for operating the multiburner system is distributed to a plurality of individual burners opening into a combustion chamber, while the gas turbine is operating, a pressure loss in the at least one distribution system is measured continuously, wherein the measured pressure loss is compared with a desired value characteristic of the respective operating state of the gas turbine, and wherein a communication is issued when the measured pressure loss deviates from the associated desired value by a predetermined value, and wherein the medium to be distributed is fed to the at least one distribution system by a pump and a regulating valve located downstream of the pump, and wherein, in order to determine the pressure in the distribution system, the pressure at the outlet of the regulating valve is measured.

3. A method for monitoring a supply system of a gas turbine having a multiburner system, the supply system comprising at least one distribution system, by which a pressurized medium required for operating the multiburner system is distributed to a plurality of individual burners opening into a combustion chamber, while the gas turbine is operating, a pressure loss in the at least one distribution system is measured continuously wherein the measured pressure loss is compared with a desired value characteristic of the respective operating state of the gas turbine, and wherein a communication is issued when the measured pressure loss deviates from the associated desired value by a predetermined value, and wherein the burners of the multiburner system are divided into burner groups wherein each burner group is assigned its own distribution system within the supply system of the gas turbine, and wherein the pressure loss is monitored separately in each distribution system.

4. A method for monitoring a supply system of a gas turbine having a multiburner system, the supply system comprising at least one distribution system, by which a pressurized medium required for operating the multiburner system is distributed to a plurality of individual burners opening into a combustion chamber, while the gas turbine is operating, a pressure loss in the at least one distribution system is measured continuously, wherein the measured pressure loss is compared with a desired value characteristic of the respective operating state of the gas turbine, and wherein a communication is issued when the measured pressure loss deviates from the associated desired value by a predetermined value, and wherein the at least one distribution system is a water distribution system for distributing water and/or steam to the burners.

5. An apparatus for monitoring the supply system of a gas turbine having a multiburner system, comprising a plurality of burners which open into a combustion chamber and which are supplied by a fuel distribution system with a pressurized liquid fuel, a first and second pressure transducer, arranged on the fuel distribution system and on the combustion chamber, the first and second pressure transducers being connected to a common monitoring unit, the signals from the first and second pressure transducers are compared with the desired value characteristic of an operating state of the gas turbine, the monitoring unit including means for issuing a communication when a measured pressure loss deviates from an associated desired value by a predetermined value.

6. The apparatus as claimed in claim 5, wherein the fuel distribution system is supplied with fuel via a fuel pump and a regulating valve, and wherein the pressure transducer is arranged behind the regulating valve in the direction of flow.

7. The apparatus as claimed in claim 5, wherein the burners are additionally supplied with water or steam by a water distribution system, and wherein a pressure transducer is arranged on the water distribution system and is connected to the common monitoring unit.

8. The apparatus as claimed in claim 7, wherein the water distribution system is supplied with water by a water pump and a regulating valve, and wherein the pressure transducer is arranged behind the regulating valve in the direction of flow.

9. The apparatus as claimed in claim 5, wherein the burners are combined in burner groups, wherein each burner group is assigned its own fuel distribution system or water distribution system, and wherein a pressure transducer is arranged for monitoring in each fuel distribution system or water distribution system and is connected to the monitoring unit.

10. The method claimed in claim 1, including measuring the rate of change of the pressure loss over time, whereby the possible cause of the deviations may be determined from observation.

* * * * *